UNITED STATES PATENT OFFICE.

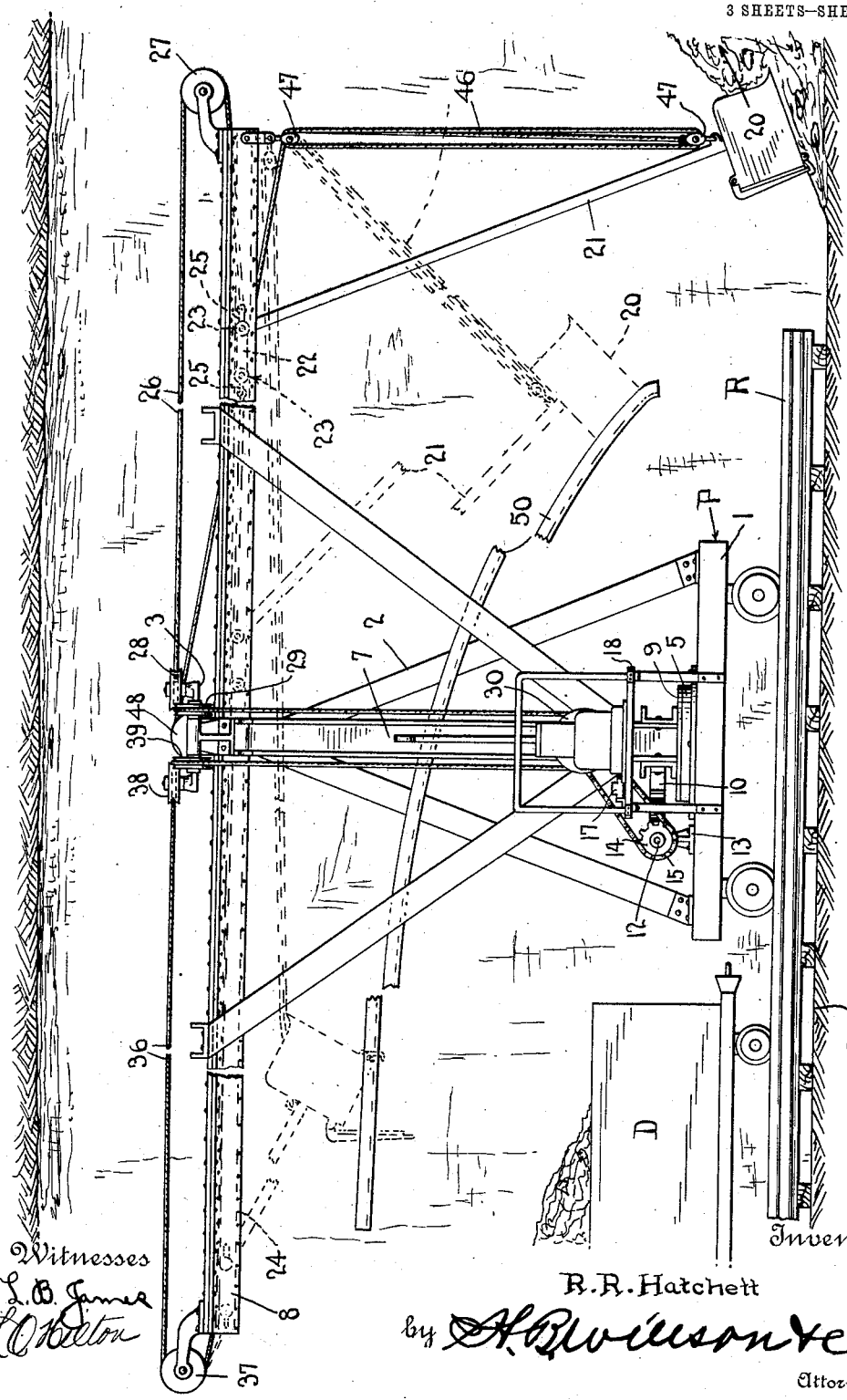

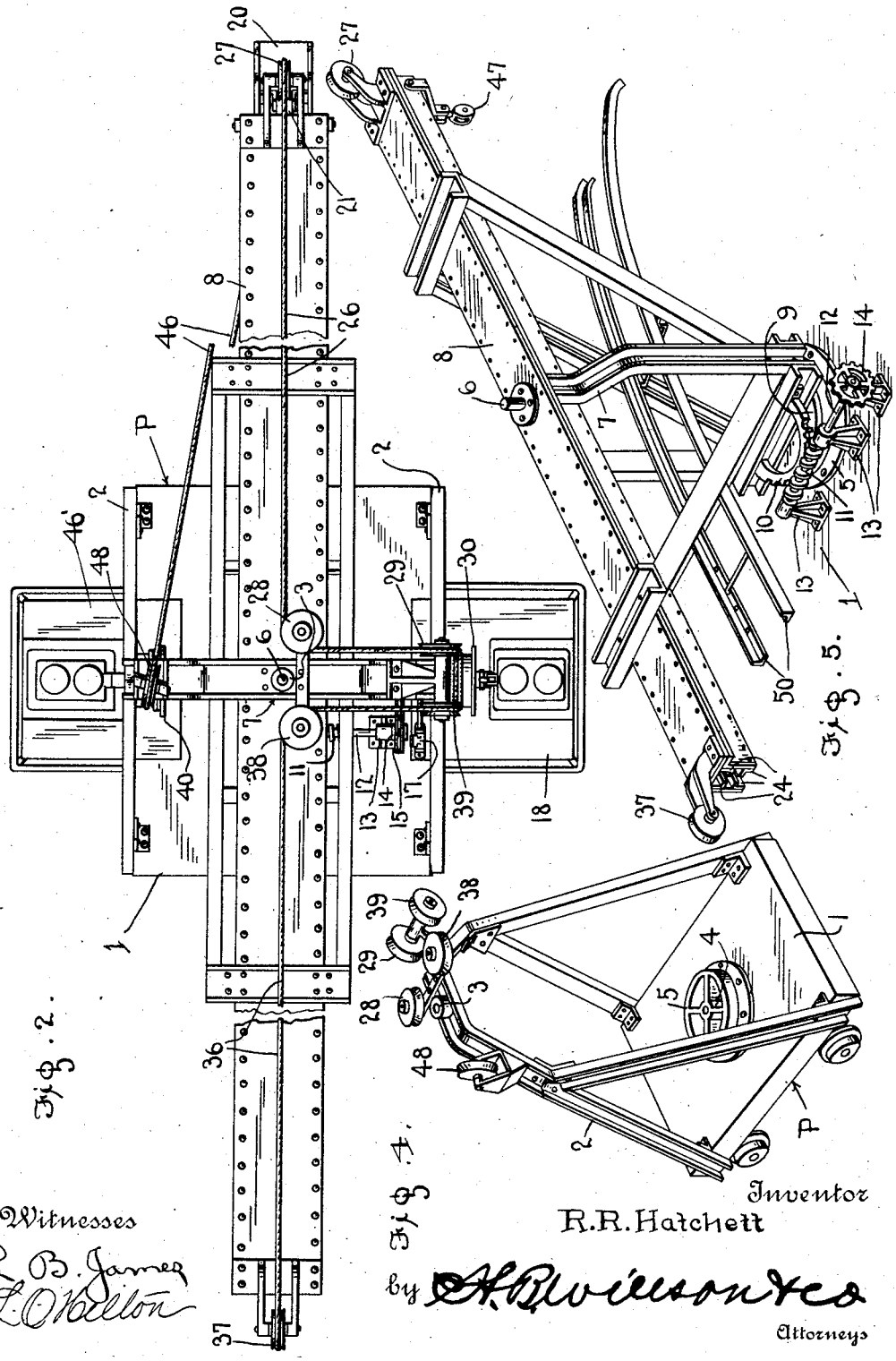

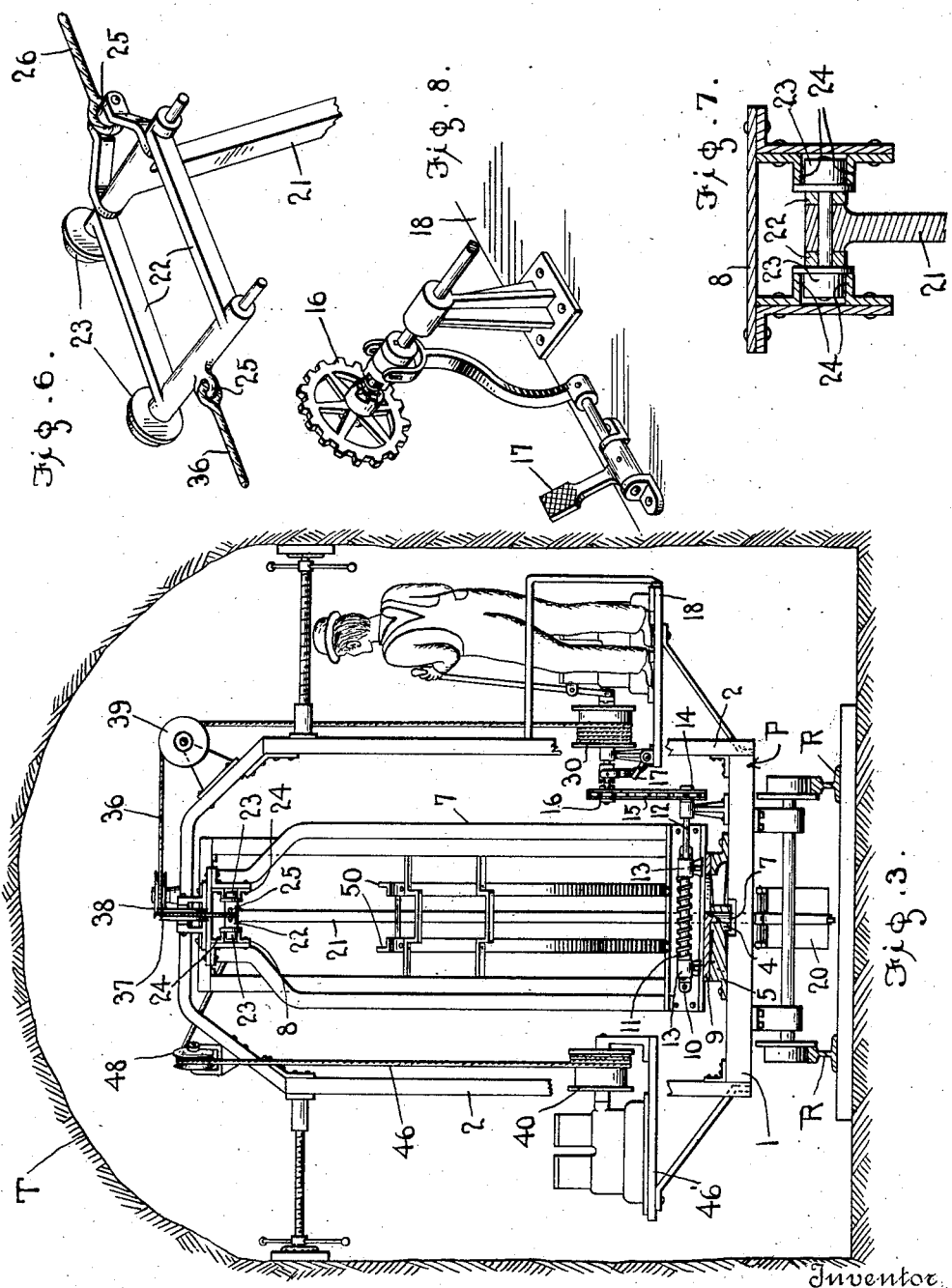

ROY R. HATCHETT, OF LOS ANGELES, CALIFORNIA.

EXCAVATOR.

1,047,804.  Specification of Letters Patent. Patented Dec. 17, 1912.

Application filed January 25, 1912. Serial No. 673,415.

*To all whom it may concern:*

Be it known that I, ROY R. HATCHETT, a citizen of the United States, residing at Los Angeles, in the county of Los Angeles and State of California, have invented certain new and useful Improvements in Excavators; and I do declare the following to be a full, clear, and exact description of the invention, such as will enable others skilled in the art to which it appertains to make and use the same.

This invention relates to excavating, and more especially to machines of that kind which employ a dipper; and the object of the same is to adapt a machine of this character for working in narrow cuts or tunnels, or tunnels with low roofs so that the space is restricted both laterally and vertically. This object is accomplished by the construction hereinafter more fully described and claimed and as shown in the drawings wherein—

Figure 1 is a side elevation of the machine with the framework omitted for the sake of clearness, and the bucket shown in various positions. Fig. 2 is a plan view of the same. Fig. 3 is a rear view, partially in section, showing the machine in a tunnel. Fig. 4 is a perspective detail of the platform car with the frame work and accessories. Fig. 5 is a perspective detail of the boom, swinging gear, and track for the bucket. Fig. 6 is an enlarged detail of the carriage with its nearer wheels omitted. Fig. 7 is a cross section through the boom, showing the carriage in position therein. Fig. 8 is a perspective detail of the right hand platform shown in Fig. 3, illustrating the foot mechanism for manipulating the sprocket for turning the frame on its pivots.

In Fig. 3 of the drawings is shown a tunnel T along which is laid a track consisting of rails R which are portable so that the track can be extended as the tunnel grows, and on this track R near its forward end travels a platform car P which carries the excavator, and in rear of the same a dump car D into which the material excavated is dumped and by which it may be removed out of the tunnel from time to time and an empty dump car substituted—all as perhaps best seen in Fig. 1. While the machine would operate with equal success in a narrow ditch which was open at the top, it will be seen from Fig. 3 that there is not much space transversely of the cut in which the machine works and it will be impossible to run the dump car to one side of the platform car in any event; hence I provide for carrying the material excavated over the top of the machine and dropping it into a dump car which travels on the same track in rear of the platform car P, and in order to carry out this general scheme the machine is built accordingly.

From the platform 1 of the car P rises a framework 2 which carries an overhead bearing 3, and upon the platform is mounted a turn table consisting of a circular track 5 carrying at its center a step bearing 4 which is directly beneath the overhead bearing 3—all as best seen in Fig. 4. In said bearings are mounted the stub shafts 6 of the frame 7 which supports the boom 8 and its companion parts, a disk 9 traveling upon the track 5 of the turn table as will be clear. The frame 7 carries a toothed sector 10 engaged by a worm 11 which is fast on a shaft 12 that finds its support in bearings 13 rising from the platform 1, and said shaft carries a sprocket 14 connected by a chain 15 to a sprocket 16 whose rotation is controlled by a foot lever 17 capable of being manipulated by a workman who stands on a platform 18 which projects to one side of the car P as best seen in Fig. 3.

The scoop or bucket 20 is mounted fast at the lower end of a pole 21 whose upper end is pivotally connected with a carriage best seen in Fig. 6. This carriage comprises a frame 22 whereon are journaled several wheels 23 adapted to travel between tracks 24 supported by the boom 8 as best seen in Fig. 7, this boom being by preference made mostly of angle iron as there illustrated. Said carriage also has eyes 25 at its front and rear, and from the former leads a rope 26, which may be well called the forward line, that extends over a sheave 27 at the front end of the boom 8, thence back and over sheaves 28 and 29 carried at the top of the frame 2, and to the winding drum 30 of a motor which is under the control of the workman standing upon said platform 18. Another rope 36, which may well be called the after line, leads from the rearmost eye 25 on the carriage, over a sheave 37 at the rear extremity thereof, and thence inward and over other sheaves 38 and 39 and downward to the same winding drum 30 around which it passes in the opposite direction. Hence it will be seen that the workman by manipulating the motor controlling the drum 30, may cause the carriage to move backward and forward upon and between the tracks 28 within the boom 8, and with the carriage moves the pole 21 and bucket 20 as will be understood. Another rope 46, which may well be called the tackle line, leads around pulley blocks 47 connected respectively with the front end of the boom and with the bucket, thence to the rear and over a sheave 48 carried upon the frame 2, and thence downward to the winding drum 40 of an independent motor mounted upon a second platform 46' which is supported from the car P at the opposite side from said platform 18 and therefore balances it. It will not be necessary to amplify the construction of the motors, but by preference they will be driven by compressed air which is always present in a mine, or if it is a ditch that is being dug they can well be electric motors provided only that their control mechanism leads to within reach of the operator illustrated in Fig. 3 if there be but one operator, or is of such character that it may be manipulated by two operators, one standing on either platform and thus balancing the machine upon the rails R. Finally guides 50 of L-iron are carried by the frame 7 and are spaced apart a sufficient distance to permit the bucket 20 to slide upon them as indicated in its various dotted positions in Fig. 1.

In operation the workman takes his place as shown in Fig. 3, or if there be two workmen one stands on each platform, the car P is moved forward on the rails R until it is in position to operate as may be required, and a dump car D is passed behind the platform car P into about the position shown in Fig. 1. By properly manipulating the motors, the bucket 20 is then caused to take the position here shown. The carriage-controlling engine is then caused to remain stationary and the hoist engine started so that its drum 40 draws in the tackle line 46 and the bucket 20 is elevated, swings outward around the carriage as a center, and moves upward so that it scrapes the material into its open mouth. When the tackle has raised the bucket as high as may be required and it is reasonably full, the hoist engine is stopped and the carriage engine started in a proper direction to draw upon the after line 36 and pay out on the forward line 26 so that the carriage moves to the rear to the first dotted line position in Fig. 1, at which time the bucket 20 strikes the front ends of the guides 50 as shown. The hoist engine is then reversed to pay out on the tackle line 46, and a continuation of the movement of the bucket-engine draws the bucket 20 and pole 21 farther to the rear as shown in the left hand dotted position in Fig. 1, the bucket traveling upward and rearward along the guides 50 until it reaches the point indicated, when its door flies open either automatically or by means of some trip and its contents is delivered into the dump car D. A reversal of the operation moves the bucket back to its point of starting, and the operation is repeated; but just before its repetition the workman manipulates the treadle 17 to turn the sprocket 16 and through the chain 15 the sprocket 14, whereby the worm is caused to move the toothed sector 10 and the entire device is swung or turned upon its pivot 6 so that the bucket in its next upward course along the earth is moved a little to one side and takes up a new charge or a charge up a new path.

Further amplification of the uses of this machine will be unnecessary to those skilled in the art. Attention is directed, however, to the fact that the load scooped up by the bucket is passed first to the rear and to a position where the bucket strikes the front ends of the guides 50 so that the latter take the weight of the bucket and its contents off of the tackle rope 46 and rod or pole 21, after which continued pull upon the after line 36 causes the travel of the bucket to the rear until it is dumped. But in its passage along said guides 50, the bucket moves through the skeleton frame 7 which supports the boom and through the frame-work 2 which supports said skeleton frame and is drawn, rather than being pushed or swung, almost straight to the rear and caused to rise only a trifle so that when it dumps its load the same can fall into a rather deep dump car D. Again, after dumping, movement of the bucket to resume its scraping operation is along the same course reversed; and hence it will be seen that this machine can operate in a narrow trench or tunnel, and if a tunnel then in one that is no higher than necessary to let the boom pass into it. The lateral platforms need be only sufficiently wide to hold one workman and the motor each, and two workmen can run this machine at considerable speed and will counterbalance each other's weight.

By preference the parts of this machine are mainly of metal, and their proportion and the details of construction are matters of no moment.

What is claimed as new is:

1. In an excavator of the type described, the combination with a support having a turn table, a skeleton framework on the support, and alined bearings at the center of said turn table and in the top of said framework; of a skeleton frame having stub shafts journaled in said bearings, means for swinging the frame on its shafts, a boom extending through said frame and having a track, a carriage thereon, means for moving it to and fro, a bucket, a pole connecting the carriage and bucket, means for raising and lowering the latter, and bucket-guides extending through said skeleton frame and upon which the bucket rides as it passes to and fro.

2. In an excavator of the type described, the combination with a support having a turn table, a skeleton framework on the support, and alined bearings at the center of said turn table and in the top of said framework; of a skeleton frame having stub shafts journaled in said bearings, means for turning said frame in either direction, a boom extending through said frame and having a track, a carriage thereon, means for moving it to and fro, a bucket, a pole connecting the carriage and bucket, means for raising and lowering the latter, and bucket-guides extending through said skeleton frame and upon which the bucket rides as it passes to and fro.

3. In an excavator of the type described, the combination with a support, a skeleton frame, means for mounting it on a vertical pivot thereon, and a boom extending through said frame and having a track; of a carriage movable on said track, a forward line and an after line leading from said carriage over sheaves at the front and rear ends respectively of said boom, a carriage-engine having a winding drum around which said lines are led in opposite directions, a pole connected with said carriage, a bucket on the pole, pulley blocks connected with the boom and bucket respectively, a tackle line leading around said blocks and over sheaves along the boom, and a hoisting-engine to whose drum said line in connected.

4. In an excavator of the type described, the combination with a support having a turn table, a skeleton framework on the support, and alined bearings at the center of said turn table and in the top of said framework; of a skeleton frame having stub shafts journaled in said bearings, means for swinging the frame on its shafts, a boom extending through said frame and having a track, a carriage movable on said track and having eyes, a forward line and an after line leading from said eyes over sheaves at the front and rear ends respectively of said boom, a carriage engine having a winding drum around which said lines are led in opposite directions, a pole connected with said carriage, a bucket on the pole, pulley blocks connected with the beam and bucket respectively, a tackle line leading around said blocks and over sheaves along the boom, and a hoisting engine to whose drum said line is connected.

In testimony whereof I have hereunto set my hand in presence of two subscribing witnesses.

ROY R. HATCHETT.

Witnesses:
 HARRY A. HOLLYES,
 W. O. MORTON.

---

Copies of this patent may be obtained for five cents each, by addressing the "Commissioner of Patents, Washington, D. C."